United States Patent [19]

Yomogida et al.

[11] Patent Number: 4,881,220

[45] Date of Patent: Nov. 14, 1989

[54] MULTIPLEX COMMUNICATION SYSTEM FOR SEQUENCE CONTROLLERS

[75] Inventors: Toshihiko Yomogida, Kariya; Tsuyoshi Yamashita, Nagoya; Shigeo Yamamoto, Kariya; Hideaki Tobita; Hisanori Nakamura, both of Toyota; Goro Kobayashi, Okazaki, all of Japan

[73] Assignees: Toyoda Koki Kabushiki Kaisha, Kariya; Toyota Jidosha Kabushiki Kiahsa, Toyota, both of Japan

[21] Appl. No.: 235,498

[22] Filed: Aug. 24, 1988

[30] Foreign Application Priority Data

Aug. 24, 1987 [JP] Japan .................. 62-210859
Aug. 9, 1988 [JP] Japan .................. 63-198394

[51] Int. Cl.$^4$ .................. H04J 1/16; H04J 3/14
[52] U.S. Cl. .................. 370/16; 370/13
[58] Field of Search .................. 370/16, 13, 86, 88, 370/89; 340/825.05; 371/8

[56] References Cited

U.S. PATENT DOCUMENTS

| | | | |
|---|---|---|---|
| 3,879,710 | 4/1975 | Maxemchuk et al. | 370/89 |
| 4,393,497 | 7/1983 | Cantwell, Jr. | 370/86 |
| 4,406,007 | 9/1983 | Kister et al. | 370/16 |
| 4,623,884 | 11/1986 | Ihara et al. | 340/825.05 |
| 4,759,009 | 7/1988 | Casady et al. | 370/86 |
| 4,779,261 | 10/1988 | Yamagishi et al. | 370/86 |

FOREIGN PATENT DOCUMENTS 5972254  4/1959  Japan .
5972255  4/1959  Japan .
6150360  5/1960  Japan .
6076830  4/1961  Japan .

*Primary Examiner*—Robert L. Griffin
*Assistant Examiner*—Wellington Chin
*Attorney, Agent, or Firm*—Oblon, Spivak, McClelland, Maier & Neustadt

[57] ABSTRACT

Among systems configured by connecting a plurality of sequence controllers to one communication line to intercommunicate, many systems has been disclosed which implement fault location and recovery from the faults. In one of these systems, each substation is connected to a circulating communication line via a branch line and switches are respectively disposed on the branch line and on the communication line at both sides of a connecting point of the branch line and the communication line. Further, the communication line can be formed in a loop by a spare line. In another of these systems, an integrated portion of the communication line is formed near the master station, and the communication line is connected to the master station and is configured of one continuous line which goes and backs in sequence between the integrated portion and vicinity of each substation. In that integrated portion, a switch is disposed on each one of two lines, which connect the integrated portion and each substation. Further, a switch is provided on a line which bypasses these two switches. Other systems are a composite of the above systems. Still other systems have automated portions of fault location and fault recovery.

9 Claims, 11 Drawing Sheets

DETECTING PROCEDURES FOR COMMUNICATION ABNORMALITY POINTS BY USING BRANCH SWITCHES

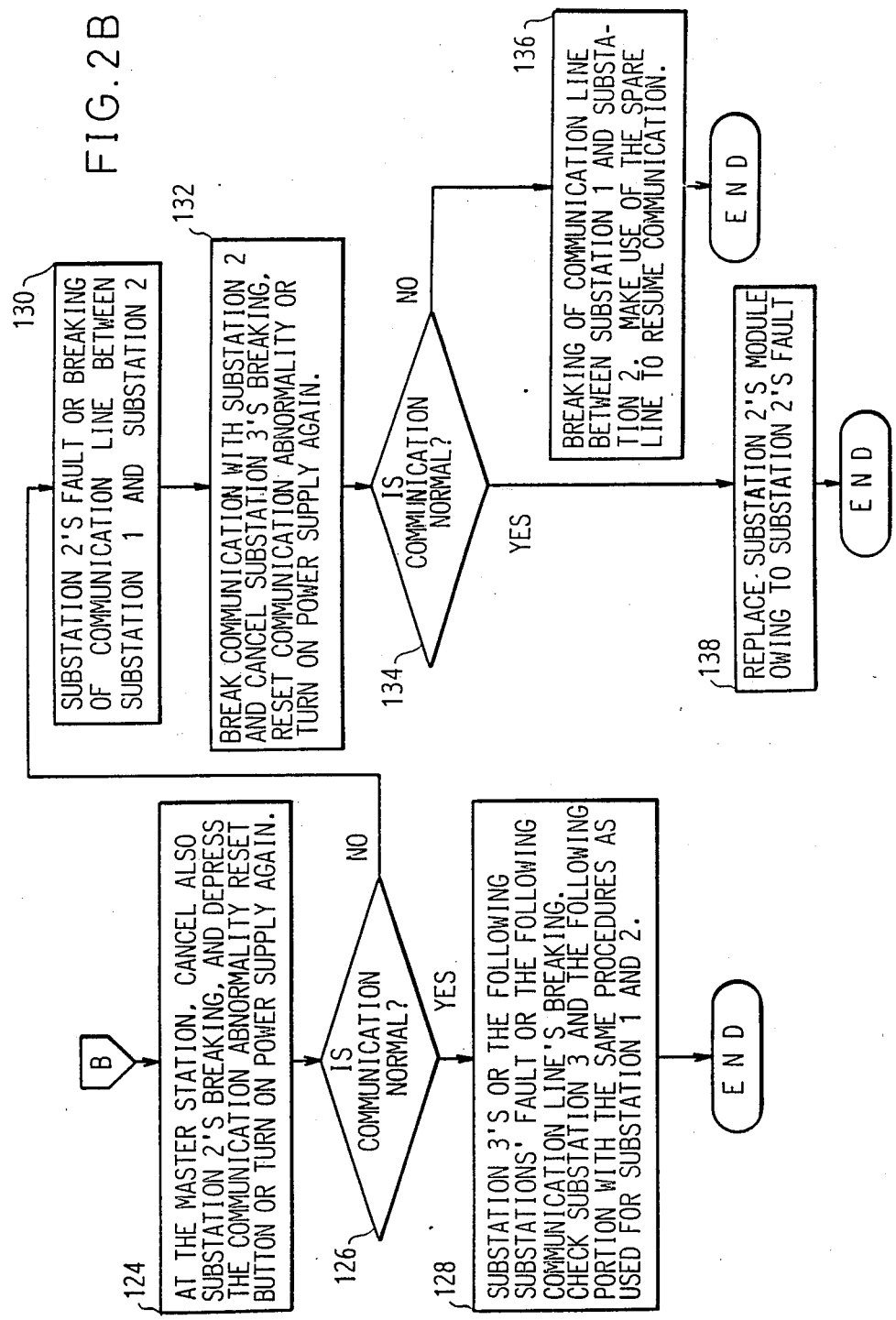

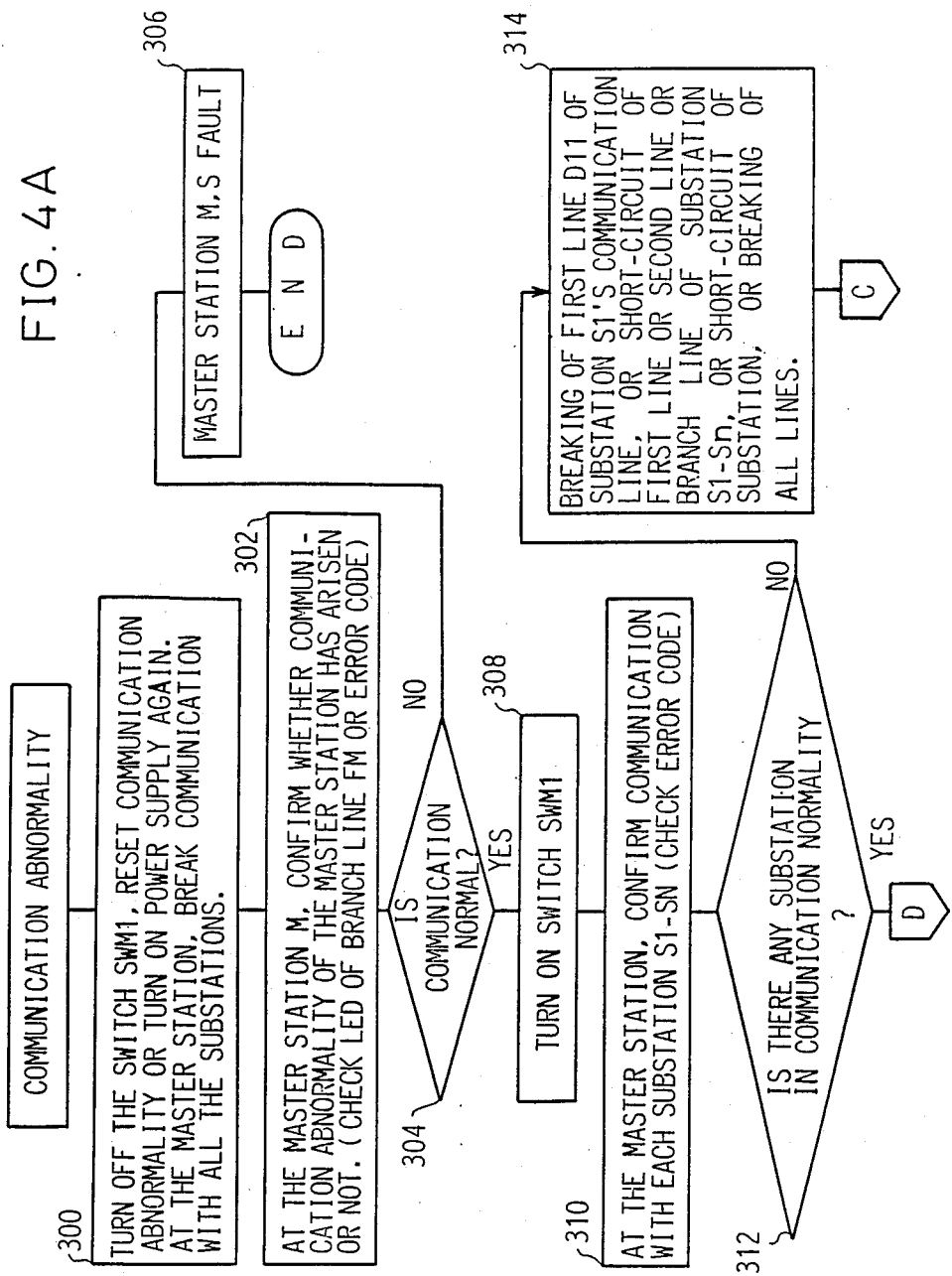

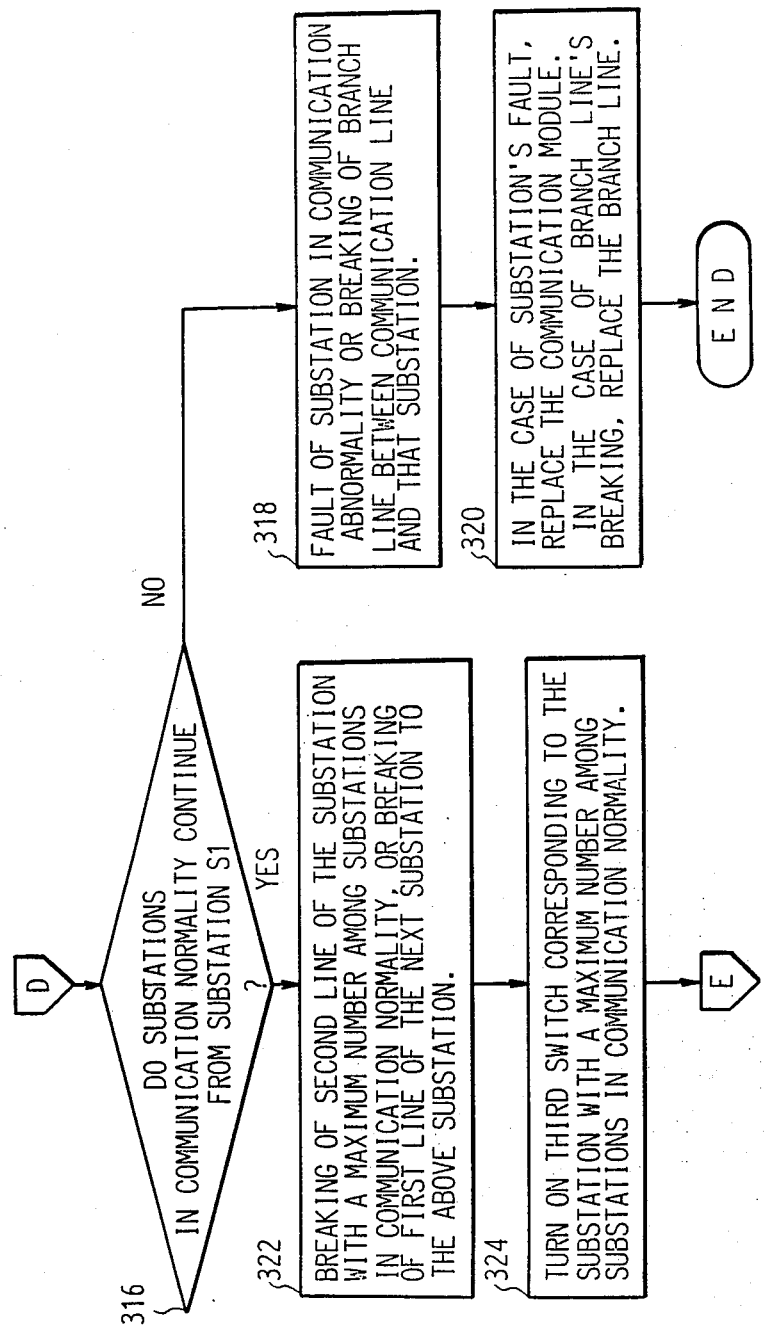

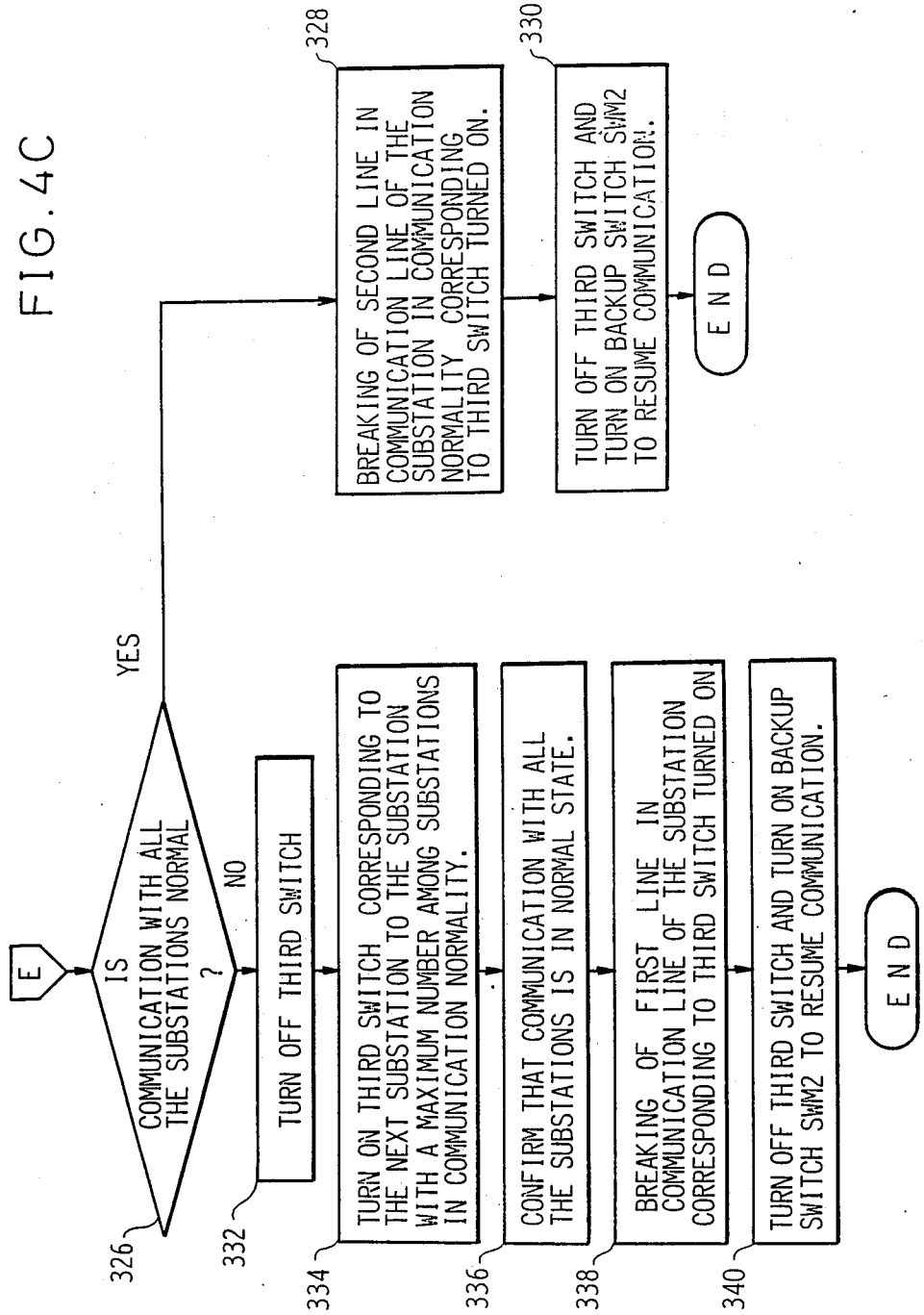

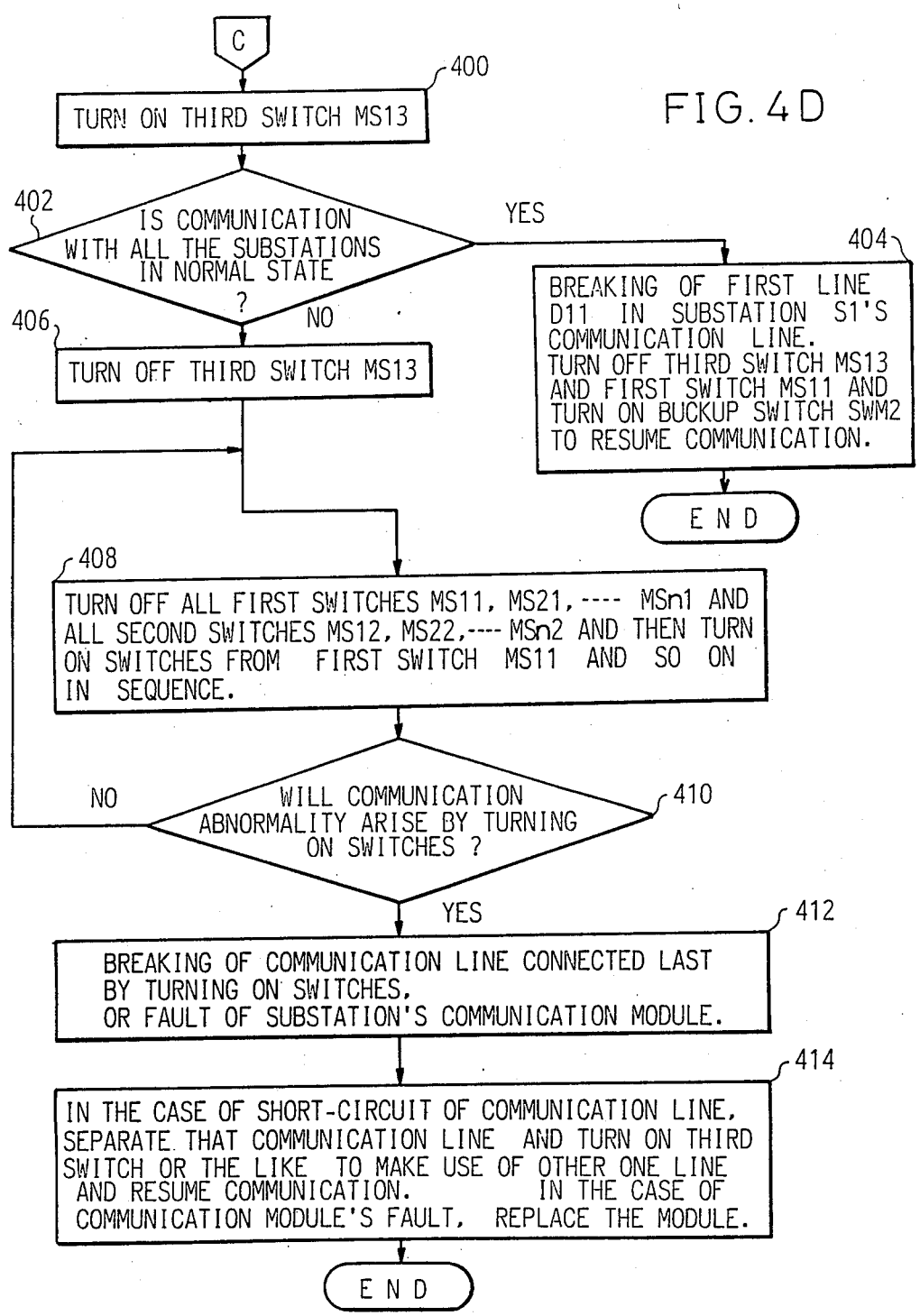

MULTIPLEX COMMUNICATION SYSTEM FOR SEQUENCE CONTROLLERS

BACKGROUND OF THE INVENTION

This invention relates to an improvement of fault processing in a system which enables multiplex communication by connecting a sequence controller disposed at each work station to a communication line to perform addressing or channel division between the master station and each substation or between substations.

Heretofore, a system is available in which a plurality of sequence controllers are disposed at work stations in a factory and connected to one communication line in series, and these sequence controllers perform data communication between them to control industrial robots or numerical control machine tools.

In this communication system, each sequence controller is directly connected in series to one communication line, therefore, there was a problem of difficulty in fault location or decision of fault mode when a fault has arisen at a station or on an intermediate transmission line. Therefore, much time is required to perform fault location and fault recovery when it has occurred, and this forced the system to stop for many hours, thereby causing a great loss of productivity.

Further, damage caused by overvoltage or overcurrent in the communication equipment connected in series by a communication cable may spread over the whole system without localizing the damage.

SUMMARY OF THE INVENTION

Therefore it is an object of the present invention to speed up and facilitate fault location and fault mode detection in a multiplex communication system for sequence controllers.

Another object of the present invention is to speed up and facilitate the processing of fault recovery which separates only the faulty station from the remaining system and enables continuous processing at the normal stations.

Still another object of the present invention is to detect at the master station fault points and fault modes to perform processing for recovery from the faults without patrolling the system distributed around in a wide factory to check states.

A still further object of the present invention is to automate the fault detection and fault recovery to minimize system down-time.

A still further object of the present invention is to prevent the communication equipment from chained damage owing to overvoltage or overcurrent.

In order to attain the above objects, in the present invention each substation is connected via a branch line to a communication line which circulates from substation to substation in sequence, and switches are disposed on that branch line and on the communication line and at the same time both sides of a connecting point of the communication line and the branch line. The communication line is adapted to be connected in a loop by a spare line. By turning on and off the above switches, a signal transmission line for any one or more stations can be completed. Under this condition, decision is made as to whether communication abnormality arises or not. By this decision the fault point can be easily specified. Further, by turning properly on and off the above switches to separate the fault point from the communication line and by connecting the spare line to the communication line to make a circuitous route for signal, the operations of the remaining normal stations can be resumed.

In another system, an integrated portion of the communication line is formed near the master station, and the communication line is connected to the master station and is configured of one continuous line which goes and backs in sequence between the integrated portion and vicinity of each substation. In that integrated portion, a switch is dispose on each one of two lines, which connect the integrated portion and each substation. Further, a third switch for bypassing is provided on a line which bypasses these two switches. By turning on and off these switches in the integrated portion, a signal transmission line can be specified. Under this specified condition, decision is made as to whether communication abnormality arises or not. By this decision the fault point can be easily specified. Further, the communication line running to the faulty substation can be separated by operation of the switches to select only normal substations. The connection of the master station and the substations can be changed from a loop shape to a star shape by operation of the bypass switch. Fault detection and fault recovery of this kind can be implemented at the integrated portion, therefore, these can be easily and speedily performed.

Further, in a composite system combining the above systems, the fault points can be particularly specified.

Still further, in another system, a computer is disposed in the integrated portion and the switches in the integrated portion are turned on and off by computer control, so that the fault detection and fault recovery can be automated.

BRIEF DESCRIPTION OF THE DRAWINGS

FIGS. 2A to 2C are flow charts showing the procedures of the abnormality diagnosis and the fault recovery of the embodiment of FIG. 1.

FIGS. 4A to 4D are flow charts showing the procedures of the abnormality diagnosis and the fault recovery of the embodiment of FIG. 3.

DESCRIPTION OF THE INVENTION

The present invention is explained on the basis of the embodiment as follows.

The first embodiment

Figure 1:
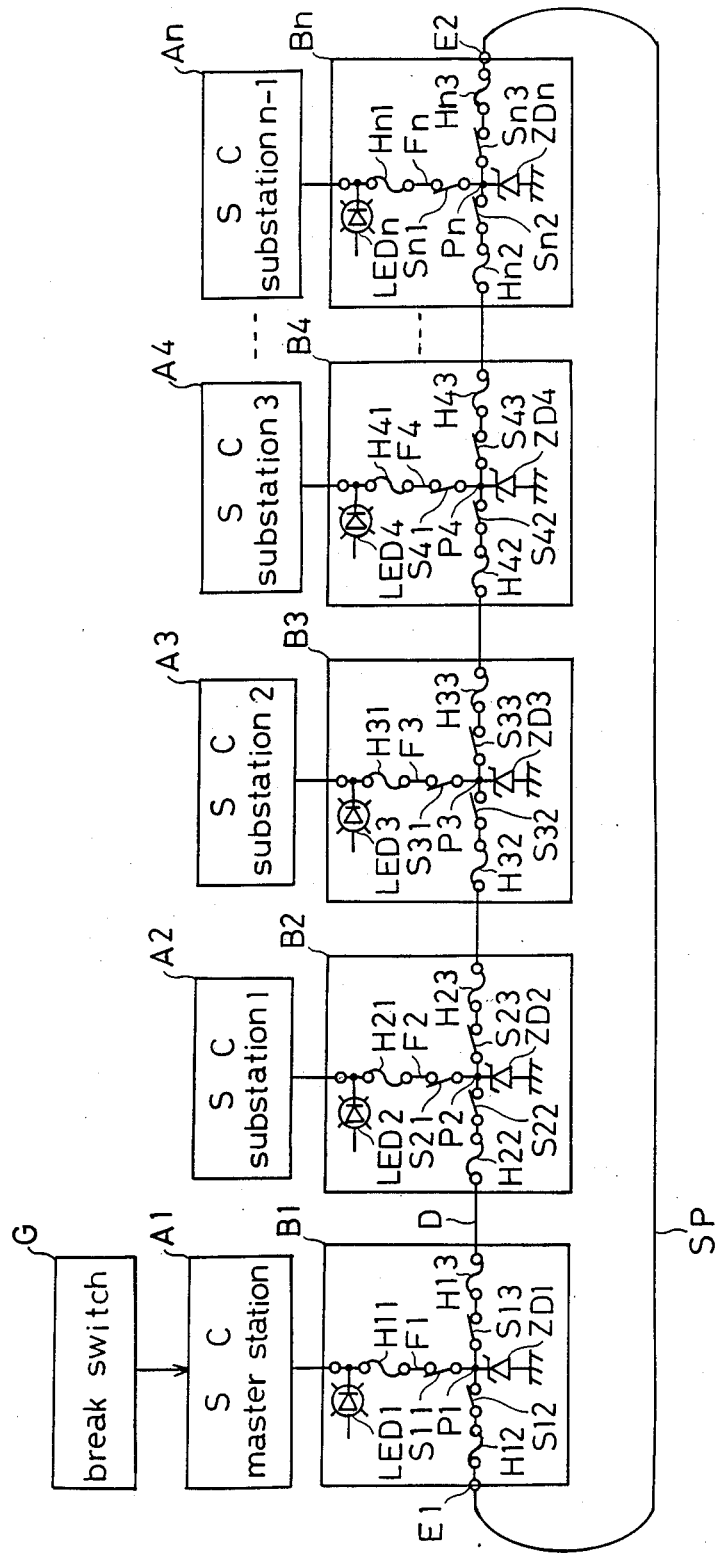
FIG. 1 is a block diagram showing the multiplex communication system for sequence controllers of one embodiment of the present invention.

In FIG. 1, a master station is provided with a master sequence controller A1, and substations are provided with substation sequence controllers A2-An respectively. The master station and substations 1–(n−1) are connected to a communication line D via branch switch circuits B1 –Bn, and the communication line D is prepared to be connected to a spare line SP at terminals E1 and E2 when such is required.

The branch switch circuit B1 is provided with a first switch S11 disposed on a branch line F1 which connects a connecting point P1 of the communication line D to the sequence controller A1, a second switch S12 and a third switch S13 disposed at both sides of the connecting point P1 on the communication line D, a Zener diode ZD1 connected between the point P1 and a ground, an LED which is lighted during communication, that is, while communication signal voltage is generated on the branch line F1 and fuses H11, H12, H13 which block over currents.

The branch switch circuit B2–Bn have the same circuit configuration as the B1.

Further, the sequence controller A1 of the master station is provided with a break switch G, which is a means for breaking logical communication between the sequence controller A1 of the master station and the sequence controllers A2–An of the substations. Next, procedures taken by an operator in fault analysis are explained as follows.

During normal operation switches S12 and Sn3 are in off-state and only the communication line D is used and the spare line SP is not used.

Figure 2A:
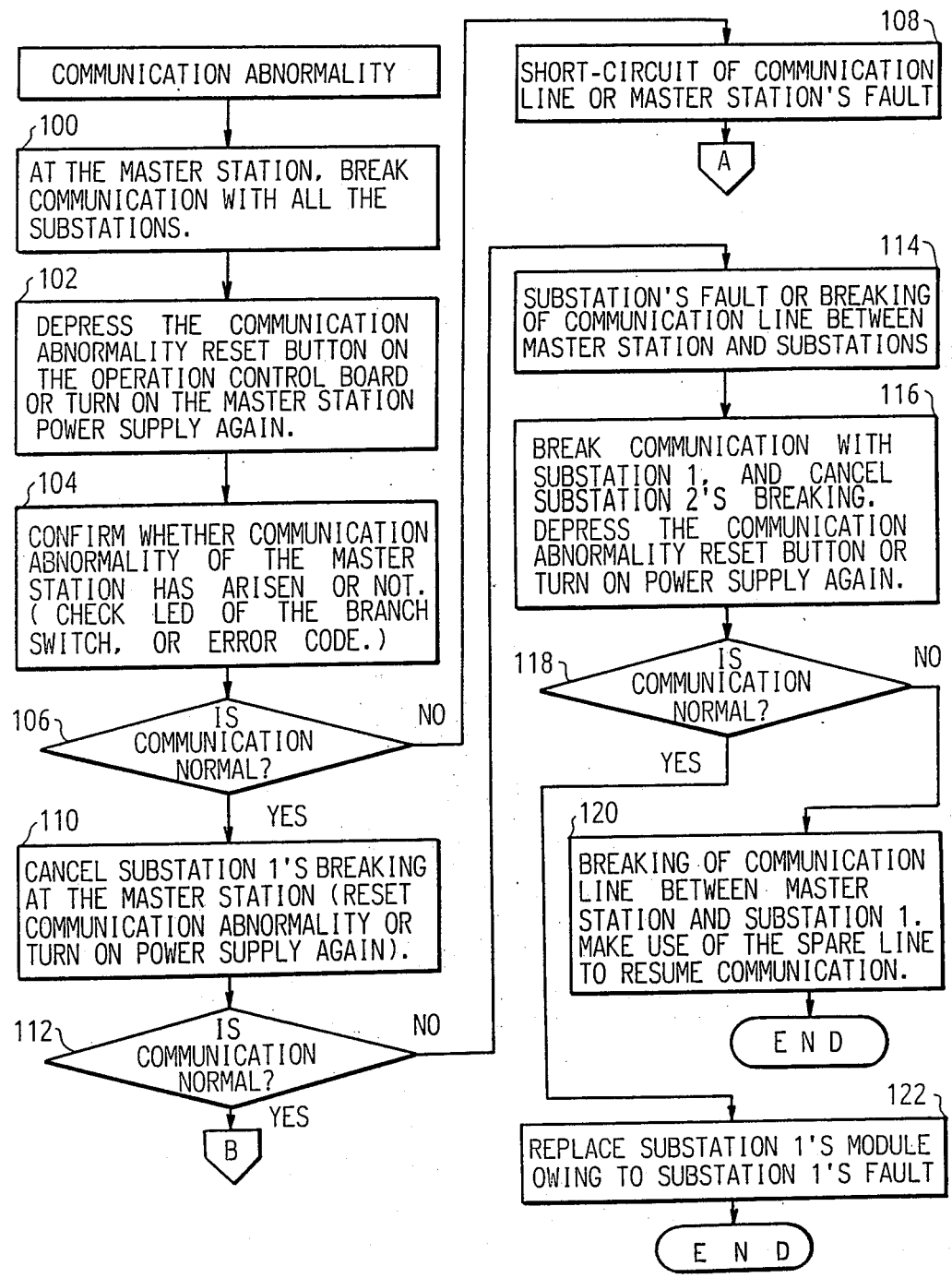
Figure 2C:
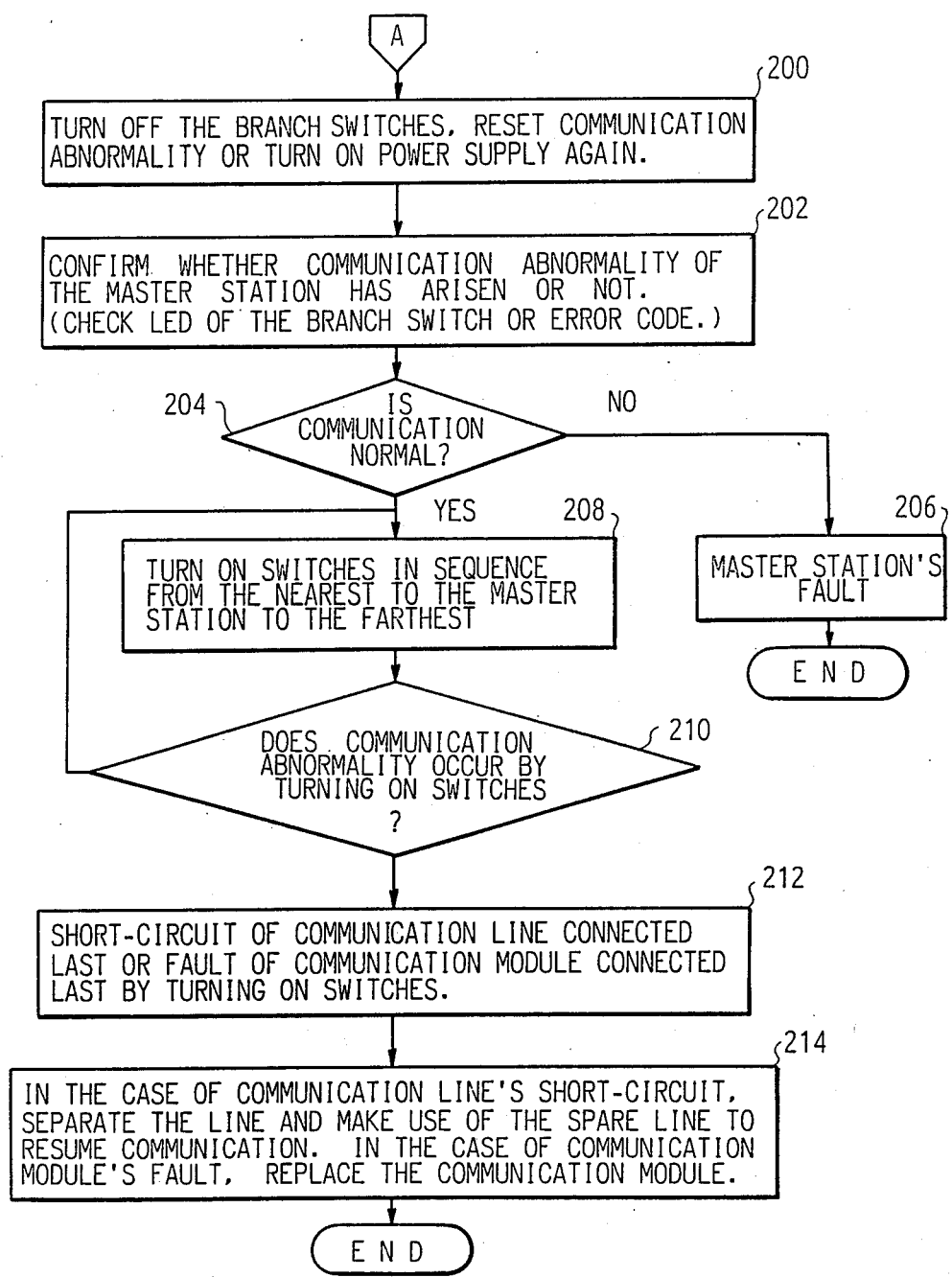

When abnormal state in communication has arisen, abnormality analysis and recovery from fault are carried out by the operator in accordance with the procedures shown in FIGS. 2A to 2C. At step 100, he breaks the logical communication with all the substations 1–(n−1) by operating the break switch G at the master station. Then, at step 102, the operator depresses a reset button on the master station operation control board (not shown) or turns on the power supply again. At step 104, whether the abnormal state in communication has arisen or not is confirmed at the master station. The communication abnormality or normality is confirmed by checking light-out of the LED1 or the error code of the sequence controller A1.

At step 106, in the case of decision of communication abnormality, the flow goes to step 108, and decision is made as to whether a short-circuit fault has arisen on a communication line part including the branch line F1 and the communication line D or the master station's fault has occurred.

In this case, the fault analysis procedure shown in FIG. 2C is executed. At step 200, at first, he cancels the break-states of the substations and turns off all switches of the master station branch switch circuit B1 and the substation branch switch circuits B2–Bn, thereafter, he depresses the master station reset button or turns on the power supply again. At the next step 202, whether the communication fault has arisen or not is decided by checking the light-out of the LED1 or the error code of the sequence controller A1. At step 204, in the case of decision of communication abnormality, at step 206 decision is made of the master station's fault. This is because existence of the communication abnormality even when the switch S11 has been turned off shows that fault has existed in the master station before the switch S11.

At step 204, in the case of decision of the communication normality, the flow goes to step 208, wherein he turns on switches from the nearest S11 to the master station to the farthest Sn1 in sequence. At step 210, whether the communication abnormality occurs or not is decided by turning the switches on, then switches S11, S13, S22, etc., are turned on in sequence until the communication abnormality occurs. For example, if the abnormality occurs as a result of turning on switch S11, such shows that the short-circuit fault has occurred in the line after S11. That is, when the fault is detected in response to turning on the switch, the decision is made that the short-circuit fault has arisen in a communication line part or a substation which were connected to the master station by turning on that switch.

In the case of the short-circuit fault of the communication line D, the operator turns off the switches of each branch switch circuit so as to exclude that short-circuit point and then turns on switches S12 and Sn3 to connect the spare line SP to the predetermined terminals, whereby communication is resumed. For example, when the short-circuit fault has arisen on the communication line D between a switch S13 and a switch S22, the operator turns off the switches S13 and S22 to exclude the communication line part between the switch S13 and the switch S22. Further, in the case of the substation's fault, communication circuit modules of that substation are replaced. Returning to FIGS. 2A and 2B, at step 106, when communication has been normally performed, the flow goes step 110. The operator cancels the break-state of one substation, for example, substation 1 among a plurality of the substations and then depresses the reset button of the master station or turns on the power supply again, so as to decide whether abnormality is detected.

At step 112, in the case of decision of the communication abnormality by checking lighting or no-lighting of the LED2, the flow goes to step 114 and the operator decides that the substation's fault or the communication line's breaking between the master station and the substation 1 has occurred. Then the flow goes to step 116, and the operator breaks logical connection with the substation 1 and cancels the break-state of the substation 2. Thereafter, he depresses the reset button of the master station or turns on the power supply again, then decides whether abnormality is detected. At step 118, in the case of decision of the communication abnormality, the flow goes to step 120 and he decides that the communication line between the master station and the substation 1 has broken. Therefore, in this case, the switches S12 and Sn3 are turned on and data is transmitted to the substation 1 and 2 and the followings via the spare line SP.

On the contrary, at step 118, in the case of decision of the normality, since this normality was obtained by making the break-state of the substation 1, at step 122, the operator decides that the substation 1's fault has occurred, and then replaces the communication circuit modules.

Further, at step 112, in the case of decision of normality, since there is no abnormality between the substation 1 and the master station, at the next step 124, he cancels the break-state of the substation 2 and also decides whether the abnormality arises or not. At step 126, in the case of decision of the normality, the operator decides that breaking of the communication line corresponding to the substation 3 and the following part has arisen or fault of the substation 3 and the following substations has occurred. At the next step 128, the break-state of the following substation is cancelled in sequence to execute fault diagnosis by the same processing as step 110–step 124.

At step 126, in the case of decision of abnormality, the flow goes to step 130 and the followings. The step 130 and the followings are the same fault diagnosis as step 114 step 122 and the breaking of the communication line between the substations 1 and 2 is decided at step 136 and the substation 2's fault is decided at step 138.

As mentioned above, in this embodiment the communication line is equipped with the branched switch circuits, each of which is provided with the switch such as S11 on the branch line which leads signal from the communication line D to the substation and the switches such as S12, S13 which are disposed on the communication line at the both sides of the connecting point that connects the branch line and the communication line. Therefore, the fault analysis for breaking or short circuit of the communication line, or the substation's fault can be implemented with ease.

Further, in the case of breaking or short-circuit of the communication line, or fault of the sequence controller, the fault portion can be separated from the communication line by using the switches and a communication bypass can be formed by the spare line.

In addition, because a Zener diode is disposed between a connecting point of the first, second and third switches and a ground, the communication line is prevented from intrusion of overvoltage, and because fuses are disposed on the communication line and the branch line, the communication equipment is prevented from passage of overcurrent.

Therefore, fault time of the entire system can be greatly reduced and fatal fault of the communication devices can be prevented, so that reliability is greatly increased.

The second embodiment

Figure 3:
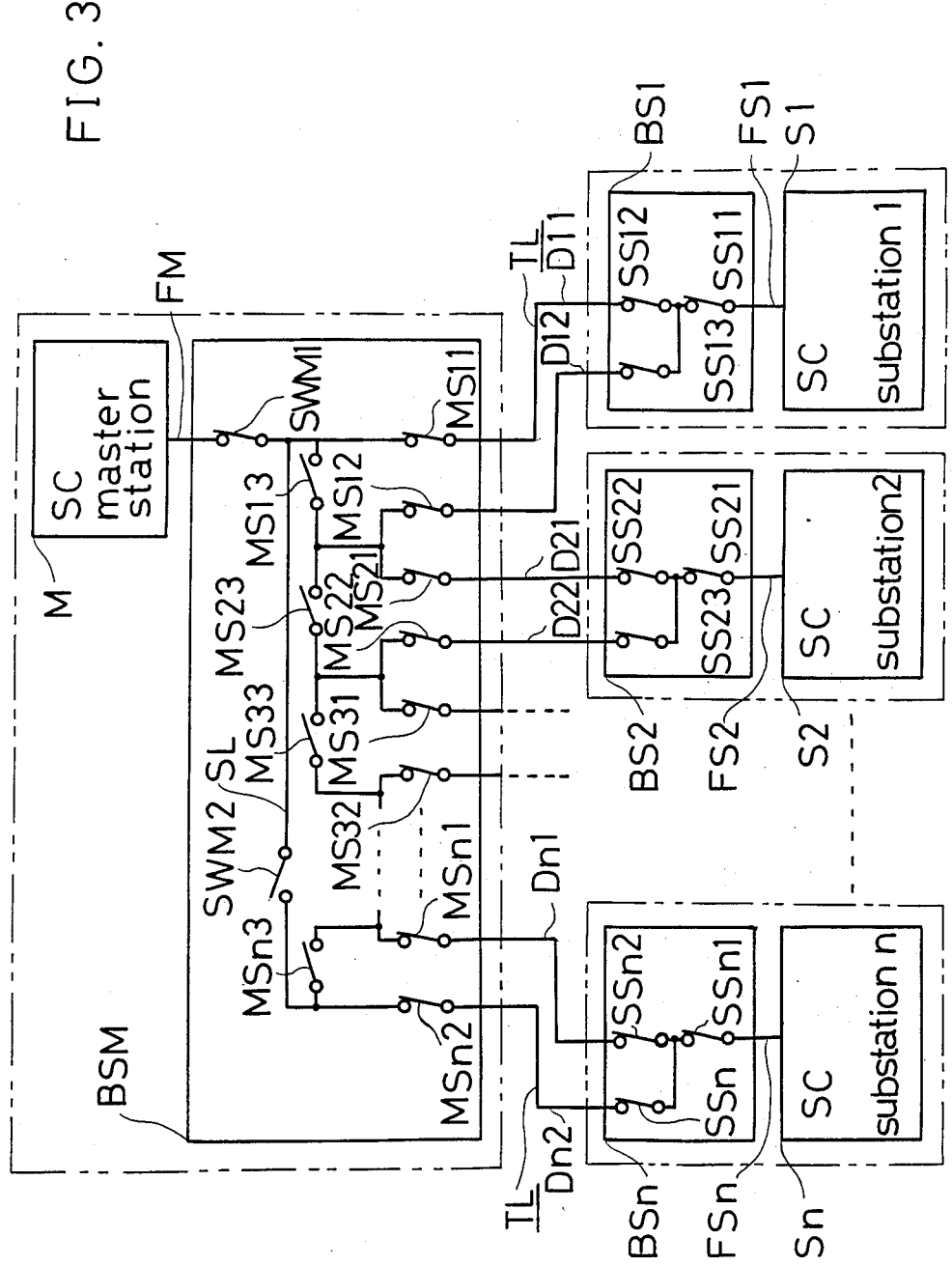
FIG. 3 is a block diagram showing the multiplex communication system for sequence controllers of another embodiment of the present invention.

In FIG. 3, a master station is provided with a master sequence controller M and other stations are equipped with substation sequence controllers S1-Sn. The master station (or sequence controller) M is connected to a communication line TL via a branch line FM and a master station branch switch circuit BSM, which constitutes an integrated portion of the communication line TL integrated near to the master station M, and substation sequence controllers S1-Sn are connected to the communication line TL via substation branch switch circuits BS1-BSn and branch lines FS1-FSn respectively. The communication line TL is comprised of first lines D11, D21, ..., Dn1 which are extended from the master station branch switch circuit BSM to substation sequence controllers S1, ..., Sn respectively, which BSM is the integrated portion, second lines D12, D22, ..., Dn2 which are connected to the first lines D11, D21, ..., Dn1 and the master station branch switch circuit BSM, and a spare line SL which makes the communication line TL of a loop.

The master station branch switch circuit BSM is provided with a switch SWM1 which is disposed on the branch line FM that connects the master station M to the communication line TL, first switches MS11, MS21, MS31, ..., MSn1 which are respectively disposed on the first lines D11, D21, ..., Dn1 in the master station branch switch circuit BSM, second switches MS12, MS22, MS32, ..., MSn2 which are respectively disposed on the second lines D12, D22, ..., Dn2, third switches MS13, MS23, MS33, ..., MSn3 which are disposed in parallel with each series circuit of the first switch, first line, second line and second switch corresponding to the above each substation, and a backup switch SWM2 disposed on the spare line SL. Now, the above each third switch serves as a bypass switch which bypasses at the master station branch switch circuit BSM the first line and the second line corresponding to each substation.

Further, the substation branch switch circuits BS1-BSn are provided with switches SS11, SS21, ..., SSn1 which are disposed on branch lines FS1-FSn that connect the substation sequence controllers S1-Sn to connecting points of the first lines and the second lines, switches SS12, SS22, ..., SSn2 which are disposed on each one side line of the connecting point on the communication line TL, that is, the first line and switches SS13, SS23, ..., SSn3 which are disposed on the second lines.

Now, the fault analysis procedures taken by an operator are explained referring to FIGS. 4A to 4D.

As shown in FIG. 3, in a normal operating condition, the backup switch SWM2 in the master station branch switch circuit BSM and the third switches MS13, MS23, MS33, ..., MSn3 are turned off, while the other switches are all turned on. That is, in the master station branch switch circuit ..., BSM, the switch SWM1, the first switches MS11, MS21, MS31, MSn1 and the second switches MS12, MS22, MS32, ..., MSn2 are turned on, and in the substation branch switch circuits BS1-BSn, the switches SS11, SS21, ..., SSn1, the switches SS12, SS22, ..., SSn2 and the switches SS13, SS23, ..., SSn3 are turned on. Thus the communication line TL goes and backs in sequence between the master station and each substation sequence controllers, and intercommunication is carried out in this condition.

When communication abnormality has arisen, the fault analysis is implemented in accordance with the procedures shown in FIGS. 4A to 4D.

At step 300, the operator turns off the switch SWM1 of the master station branch switch circuit BSM, separates the communication line TL following the switch SWM1 from the master station M, breaks communication with all the substations at the master station, and depresses reset button of the master station operation control board (not shown) or turns on the power supply again. Next, at step 302, he confirms light-out of LED (not shown) which is lighted while communication signal voltage is generated on the branch line FM, or confirms error code of the master station M. By these confirmation, communication fault condition is analyzed. At step 304, decision is made as to whether abnormality of the master station M has occurred or not. At step 304, on deciding of the abnormality, the flow goes to step 306 and the decision of the master station M's fault is made. This is because existence of the abnormality even when switch SWM1 has been turned off shows that fault has existed in the master station M before switch SWM1.

Then, at step 304, on deciding of the normality, the flow goes to step 308 wherein the operator turns on again switch SWM1 which was turned off at step 300. At the next step 310, the operator confirms condition of communication with the substation S1-Sn by checking error code at the master station. The condition of communication faults is thus analyzed. Then at step 312, decision is made as to whether there is any substation sequence controller which can normally communicate with the master station M or not. At step 312, in the case of decision that there is no substation sequence controller in normal communication, then the flow goes to step 314, and decision is made that the first line D11 of the communication line of the substation S1 has broken, or any one of the first lines D11-Dn1 or the second lines D12-Dn2 of the substations S1-Sn or the branch lines FS1-FSn which connect the substation S1-Sn to the communication line TL has short-circuited, or any one of the substations S1-Sn has had a fault of short-circuit, or all lines has broken.

In this case, the fault analysis procedures shown in FIG. 4D are implemented. First, the flow shifts to step 400, the operator turns on the third switch MS13 in the master station branch switch circuit BSM which corresponds to the substation S1. At the next step 402, decision is made that whether communication with all the substations is in normal condition or not. At step 402, on deciding of normal communication with all the substations the flow goes to step 404, and the decision is made that the first line D11 of the substation S1 has broken. Because the third switch MS13 corresponding to the substation S1 is turned on, even if signal does not pass the first line D11, the master station can communicate with all the substations. In this case, he turns off the third switch MS13 which was turned on at step 400 and turns off the first switch MS11 and turns on the backup switch SWM2, so that communication with all the substations can be thus resumed.

Further, at step 402, in the case of decision that communication with the substations is not all in normal condition, the flow goes to the next step 406, wherein he turns off the third switch MS13 corresponding to the substation S1 which was turned on at step 400. Then, at step 408, he turns off all the first switches MS11, MS21, ..., MSn1 and all the second switches MS12, MS22, ..., MSn2, thereafter turns on the first switches in sequence from MS11 which corresponds to the substation S1. At step 410, decision is made that whether the communication abnormality arises or not by turning on the switches. The switches are turned on in sequence from MS11, MS12, MS21, MS22, MS31, MS32, etc., until the decision of the abnormality is made. On occurrence of the abnormality, the flow shifts to step 412 and decision is made that the communication line which was last connected by turning on the switch has short-circuited or a communication circuit module of the substation connected to that communication line has had a fault. For example, if the abnormality occurs when the first switch MS11 is turned on, such shows that short-circuit has arisen on the communication line between the first switch MS11 and the second switch MS12, that is, on the first line D11 and the second line D12, or on the branch line FS1 between the communication line TL and the substation S1, or in the substation S1. Finally, the decision is made that the short-circuit has occurred on the communication line part or in the substation which is connected to the master station by turning on the switch that enables first detection of the communication abnormality. The flow shifts to step 414, where at first, in order to separate the short-circuited substation from the system, the operator turns off the first switch and the second switch which correspond to that substation and turns on all the first switches and all the second switches which correspond to the other substations, and further, turns on the backup switch SWM2, so that communication with the other substations can be resumed. At this time, the third switch on the faulty system may be turned on in place of turning on the backup switch SWM2. In this way, at first performing fast recovery from the fault and then by turning off the switches of the substation branch circuit on the faulty substation system, the system can be particularly checked in locating the short-circuit position on the first line or the second line or the branch line or in the substation. When occurrence of the short-circuit on the first line becomes clear, the corresponding substation can communicate with the master station by turning on the second switch, turning off the first switch and turning on the third switch. After recovery from the fault, the short-circuited first line should be replaced with new one, Further, when occurrence of short-circuit on the second line becomes clear, the first switch and the third switch should be turned on and the second switch should be turned off. Still further, when occurrence of short-circuit on the branch line or in the substation becomes clear, either or both of these portions should be replaced with a new one.

Returning to FIG. 4A, at step 312, in the case of existence of one or more substations in normal communication, the flow goes to step 316, where decision is made regarding whether the substations in normal communication continue from the substation S1 or not. At step 316, in the case of decision that the substations in normal conditions do not continue from the substation S1, that is, when the substation S1 is in normal communication and an intermediate substation along the following substations S2-Sn is an abnormal communication, the flow goes to step 318, where decision is made that a fault has arisen in the communication abnormal substation or a line breaking has occurred on the branch line between the communication line and that substation. Then, the flow shifts to step 320, where at first, in order to separate the faulty substation from the remainder, the operator turns off the first switch and the second switch for that faulty substation and turns on all the first and the second switches corresponding to the other substations. Further, he turns on the backup switch SWM2, whereby communication with the other substations can be resumed. At this time, the third switch on the faulty system may be turned on in place of turning on the backup switch SWM2. In this way, after performing fast recovery from the fault, the communication circuit module or the branch line is replaced.

At step 316, in the case of decision that the substations in normal communication continue from the substation S1, the flow shifts to step 322, where decision is made that the second line of the substation with a maximum number among the normal substation or the first line of the next substation has broken. At the next step 324, he turns on the third switch corresponding to the substation with a maximum number among the normal substations. At step 326, decision is made of whether communication with all the substations have become normal or not. At step 326, in the case of decision that communication with all the substations is in normal condition, the flow goes to step 328, where decision is made that the second line has broken which is in the communication line of the normal communication substation corresponding to the third switch that has been turned on at step 324. Then at step 330, the operator turns off the third switch which has been turned on at step 324 and turns on the backup switch SWM2 in the master station branch switch circuit BSM, whereby communication with all the substations can be resumed.

Further, at step 326, in the case of decision that communication with the substations are not all in normal condition, the flow goes to step 332, where the operator turns off the third switch that has been turned on at step 324. At step 334, he turns on the third switch corresponding to the substation next to the normal communication substation with a maximum number. Then the flow shifts to step 336, where he confirms that communication with all the substations is in normal condition. At the next step 338, decision is made that the first line of the substation has broken, which corresponds to the third switch that has been turned on at step 334. At step 340, the operator turns off the third switch that has been turned on at step 334 and turns on the backup switch SWM2, whereby communication can be resumed.

Thus, in the case of line breaking of the first and the second lines, communication with all the substations can be fast resumed with the fault diagnosis.

In this way, in this embodiment, the master station branch switch circuit BSM is located in the vicinity of the master sequence controller M. This branch switch circuit BSM is provided with the switch SWM1 which is disposed on the branch line FM that connects the master station M to the communication line, the first switches MS11, MS21, MS31, . . . , MSn1 which are respectively disposed on the first lines of the communication line which leads signal to each substation sequence controller S1-Sn, the second switches MS12, MS22, MS32, . . . , MSn2 which are respectively disposed on the second lines, the third switches MS13, MS23, MS33, . . . , MSn3 which are disposed in parallel with each series circuit of the first switch, first line, second line and second switch, and the backup switch SWM2 disposed in the line which connects the communication line in a loop. Therefore, the fault analysis and the recovery from the fault for the communication line breaking or short-circuit can be fast implemented at the location of the master station without making round service to each substation. Further, because the master station M and each substation S1-Sn are connected by the two communication lines of the first and the second lines, even if one communication line is broken, the communication can be resumed by turning on the backup switch SWM2 or third switch MS13, etc., without repairing that faulty line. In the case of short-circuit, the communication with other normal substations can be resumed by turning off the first and the second switches to separate the faulty substation from the remaining normal substations and by turning on the backup switch SWM2 or third switch MS13, etc. The above third switch is used to decide which of the first or the second line has broken. In addition to this, it has a function of bypassing the communication line in the master station branch switch circuit BSM and therefore, is useful to deal with simultaneous occurrence of faults in a plurality of substation systems. Further, the starconnection between the master station and substations can be performed by turning on all the third and all the first switches and turning off all the second switches.

The third embodiment

Figure 5:
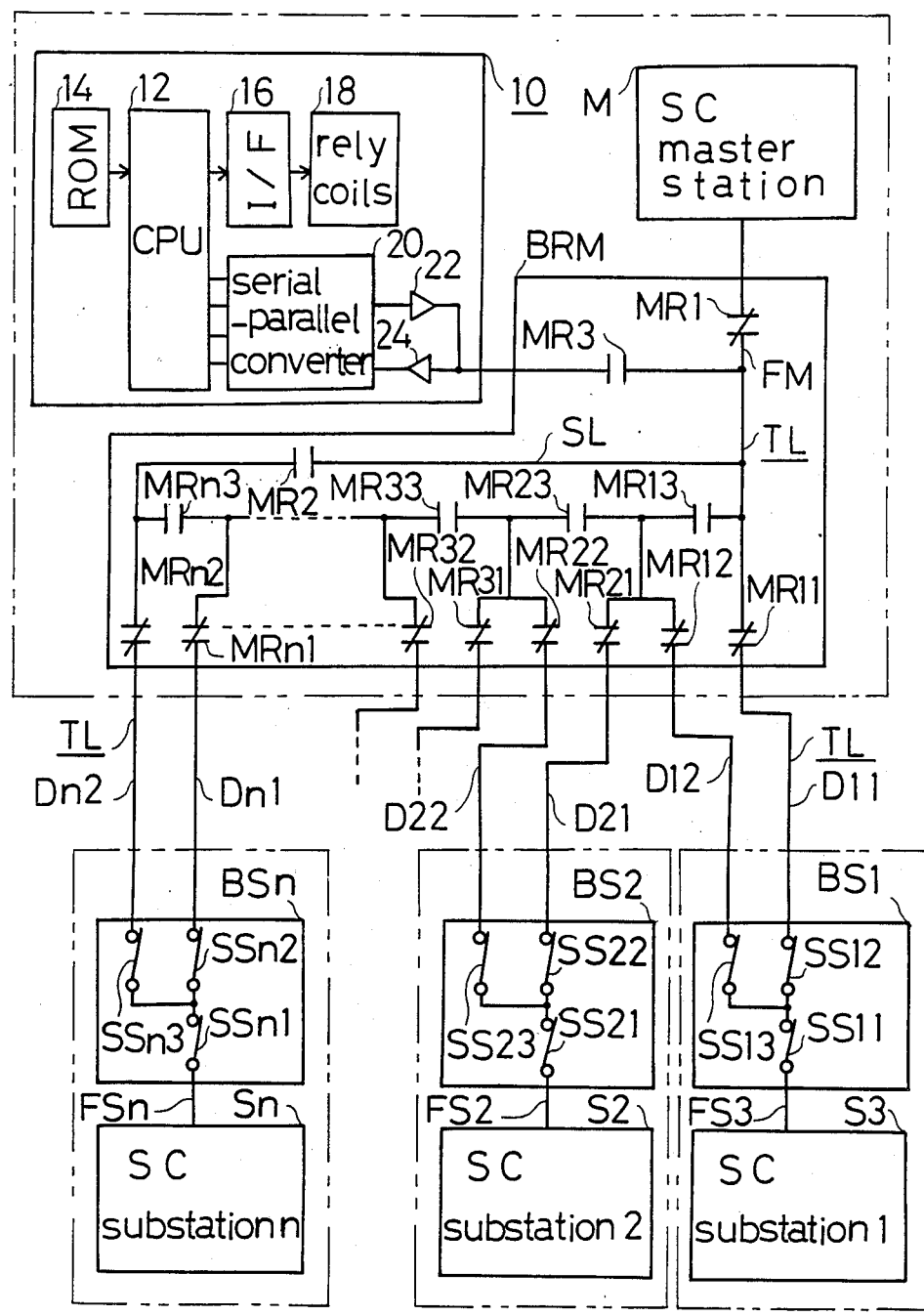
FIG. 5 is a block diagram showing the multiplex communication system for seqnence controllers of still another embodiment of the present invention.

FIG. 5 shows a system which performs the fault detection and the recovery from fault of the second embodiment by using a microcomputer. In FIG. 5, a controller 10 is connected to a branch line FM of a master station M and is connected to a master station branch relay circuit BRM which is configured of relays in place of the aforementioned manual switches in the master station branch switch circuit BSM. The switches in the circuit configuration of the second embodiment are replaced by relays as follows: switch SWM1 by an normallyclosed relay contact MR1, first switches MS11, MS21, MS31, . . . , MSn1 by first normally-closed relay contacts MR11, MR21, MR31, . . . , MRn1, second switches MS12, MS22, MS32, . . . , MSn2, by second normally-closed relay contacts MR12, MR22, MR32, . . . , MRn2, third switches MS13, MS23, MS33 . . . , MSn3 by third normally-opened relay contacts MR13, MR23, MR33, . . . , MRn3, switch SWM2 by a normally-opened relay contact MR2. The controller 10 is comprised of a CPU12, ROM14 which stores function programs indicated with the flow charts of FIGS. 4A to 4D to perform automatic diagnosis and automatic recovery for abnormal communication portions, a plurality of relay coils 18 which are driven by the CPU12 via an interface 16 and which open or close the aforementioned relay contacts, serial-parallel converter 20 for communicating with each substation S1-Sn, a driver 22 and a receiver 24.

Thus, by opening the relay contact MR1 disposed on the branch line FM of the master station M, closing the relay contact MR3 on the controller 10 side and connecting the controller 10 to the communication line TL, detection of faulty modes and locations and automatic recovery from the faults can be implemented by operating the relays 18 with the same procedures as the second embodiment.

Automatic diagnosis of the communication abnormality points by using the controller 10 enables the fault analysis for breakings or short-circuits of the communication line or the substation's faults, and moreover, switch operation for recovery can be performed by the computer. Therefore even an unfamiliar worker can perform recovery operation, thus minimizing downtime due to the communication abnormality.

The fourth embodiment

Figure 6:
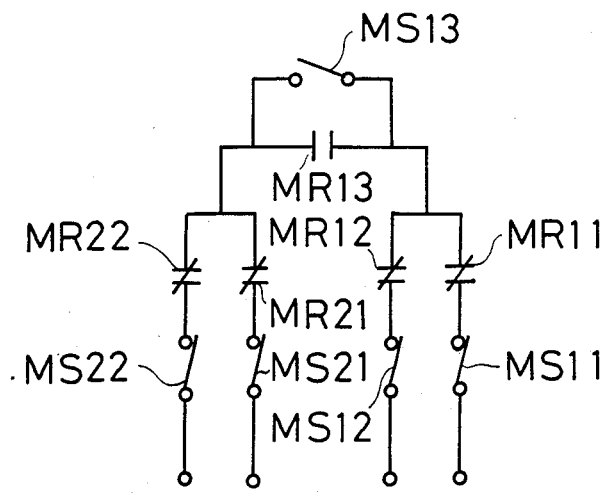
FIG. 6 is a circuit diagram showing another embodiment of the integrated portion.

As shown in the circuit diagram of FIG. 6, the first, the second and the third switches may be configured of the relay contacts together with manual switches. In this case, if any one of the relays caused a fault, a switch can be manually operated, thus the embodiment provides a more reliable system for detecting the communication abnormality points.

What is claimed is:

1. A multiplex communication system for plural sequence controllers disposed in respective of plural stations and connected in sequence to a communication line, comprising:
    plural first switches, each first switch disposed on a branch line which connects a sequence controller of a respective station to said communication line;
    plural second switches and plural third switches, said second and third switches connected in series, with each of said second switches disposed on one side of a connecting point of a respective branch line of a respective sequence controller to said communication line and each of said third switches connected to the other side of the connecting point of the respective branch line of the respective sequence controller to said communication line; and
    a spare line which connects in a loop the second switch of the respective sequence controller at one end of the sequence of sequence controllers with the third switch of the respective sequence controller at the other end of the sequence of sequence controllers thereby forming a line in parallel with the series connected second and third switches.

2. A multiplex communication system for sequence controllers according to claim 1, comprising:
    plural Zener diodes, each Zener diode connected at a respective of said connecting points of respective of said branch lines to said communication line.

3. A multiplex communication system for sequence controllers according to claim 2, further comprising:
plural fuses connected in series with respective of said first switches in respective of said branch lines.

4. A multiplex communication system for plural sequence controllers disposed in respective of plural stations and connected in sequence to a communication line, wherein one of said sequence controllers is specified as a master station and the others as substations, comprising:
a first switching network disposed at the location of the master station and selectively interconnecting said master station with said substations, said first switching network comprising plural sets of first, second and third switches;
plural sets of first and second lines for selectively interconnecting respective of said slave stations in a separate manner via respective sets of said plural sets of first, second and third switches, wherein each of first switch is disposed on a respective first line, each second switch is disposed on a respective second line and each third switch is disposed bridging respective of said first and second lines, and said first and second lines are interconnected at respective connecting points at the location of respective slave stations;
the third switches of said sets of switches being connected in series across said sets of first and second lines, with one end of the series connected third switches being connected to the master station; and
each substation having a branch line connecting the respective substation to the connecting point of the respective first and second lines.

5. A multiplex communication system for sequence controllers according to claim 4, further comprising:
plural second switching networks disposed at the locations of respective of said substations, each second switching network comprising a switch disposed on the branch line of the respective substation and switches disposed at both sides of said connecting point of the respective first and second lines of the respective substation.

6. A multiplex communication system for sequence controllers according to claim 4, further comprising:
a spare line connected in parallel with the series connected third switches for connecting said series connected third switches in a loop; and
a backup switch disposed on said spare line.

7. A multiplex communication system for plural sequence controllers disposed in respective of plural stations and connected in sequence to a communication line, wherein one of said sequence controllers is specified as a master station and the others as substations comprising:
a first switching network disposed at the location of the master station and selectively interconnecting said master station with said substations, said first switching network comprising plural sets of electronically controlled first, second and third switches;
plural sets of first and second lines for selectively interconnecting respective of said slave stations in a serpentine manner via respective sets of said plural sets of first, second and third switches, wherein each first switch is disposed on a respective first line, each second switch is disposed on a respective second line and each third switch is disposed bridging respective of said first and second lines, and said first and second lines are interconnected at respective connecting points at the location of respective slave stations;
the third switches of said sets of switches being connected in series across said sets of first and second lines, with one end of the series connected third switches being connected to the master station;
each substation having a branch line connecting the respective substation to the connecting point of the respective first and second lines;
control means for controlling ON/OFF states of the said first, second and third switches so that when a substation indicates the existence of a fault, that substation is disconnected from remaining substations by controlling the first and second switches in the first and second lines connected to that substation to be open and the respective third switch bridging the said open first and second switches to be closed.

8. A multiplex communication system for sequence controllers according to claim 7, further comprising:
plural second switching networks disposed at the locations of respective of said substations, each second switching network comprising a switch disposed on the branch line of the respective substation and switches disposed at both sides of said connecting point of the respective first and second lines of the respective substation.

9. A multiplex communication system for sequence controllers according to claim 7, further comprising:
a spare line connected in parallel with the series connected third switches for connecting said series connected third switches in a loop; and
a backup switch disposed on said spare line.

* * * * *

UNITED STATES PATENT AND TRADEMARK OFFICE
CERTIFICATE OF CORRECTION

PATENT NO. : 4,881,220

DATED : Nov. 14, 1989

INVENTOR(S) : Toshihiko Yomogida, et al

It is certified that error appears in the above-identified patent and that said Letters Patent is hereby corrected as shown below:

On the title page:

In the name of the second Assignee: "Kiahsa" should be replaced by --Kaisha--

Signed and Sealed this

Fifteenth Day of January, 1991

*Attest:*

HARRY F. MANBECK, JR.

*Attesting Officer*      *Commissioner of Patents and Trademarks*